(No Model.) 2 Sheets—Sheet 2.

J. POLLOCK.
SEPARATOR AND SCREEN.

No. 464,776. Patented Dec. 8, 1891.

WITNESSES
H. S. McArthur
Will E. Neff

INVENTOR
James Pollock
by J. A. Watson
Attorney

UNITED STATES PATENT OFFICE.

JAMES POLLOCK, OF WILKES-BARRÉ, PENNSYLVANIA.

SEPARATOR AND SCREEN.

SPECIFICATION forming part of Letters Patent No. 464,776, dated December 8, 1891.

Application filed July 22, 1891. Serial No. 400,343. (No model.)

*To all whom it may concern:*

Be it known that I, JAMES POLLOCK, a citizen of the United States, residing at Wilkes-Barré, in the county of Luzerne and State of Pennsylvania, have invented certain new and useful Improvements in Separators and Screens, of which the following is a specification.

My invention relates to screens and separators; and it consists in a machine adapted to screen and separate into different sizes coal, salt, ores, and other material requiring such separation.

The various novel features of construction and arrangement constituting my invention will be described in the following specification, reference being had to the accompanying drawings, in which—

Figure 1:
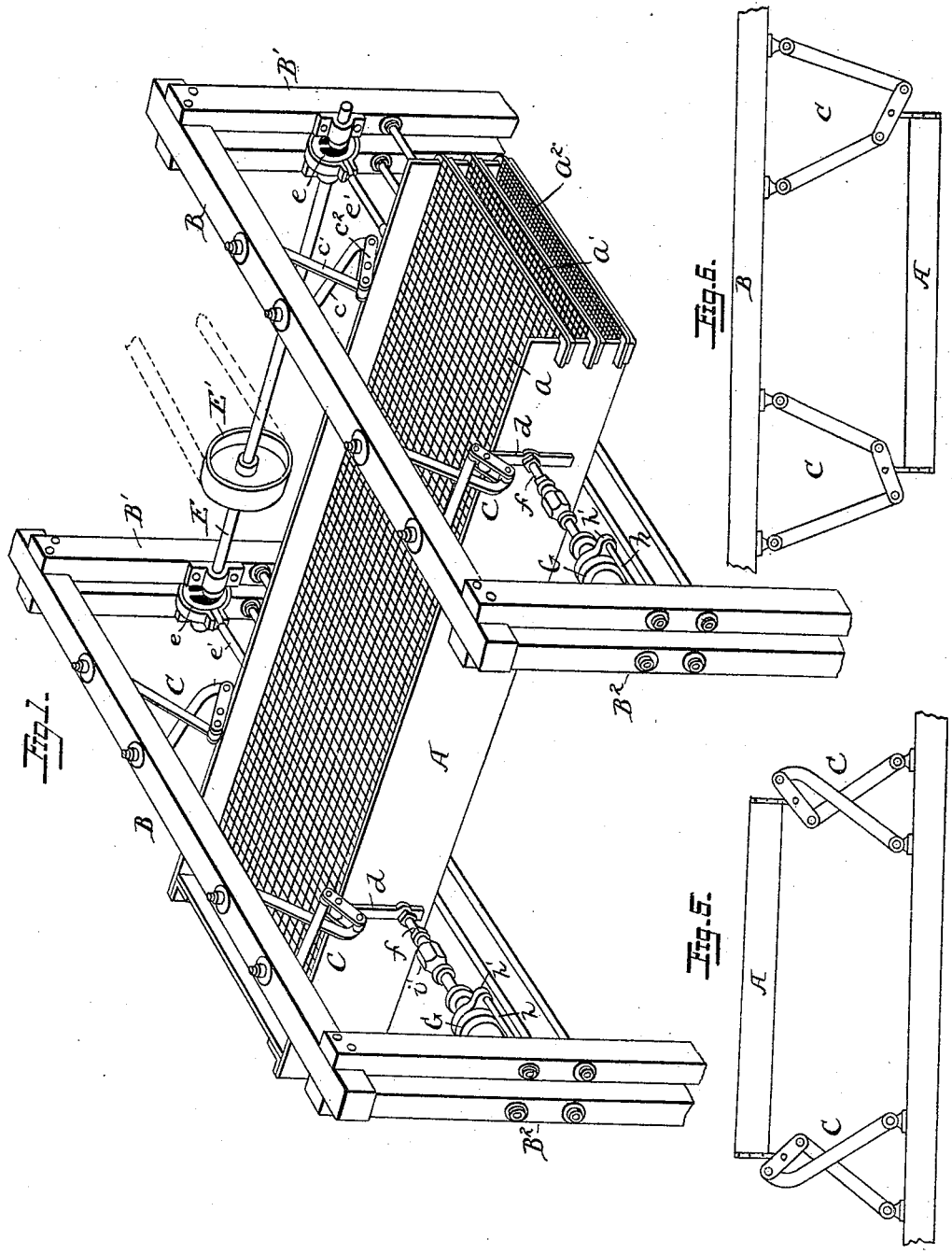
Figure 2:
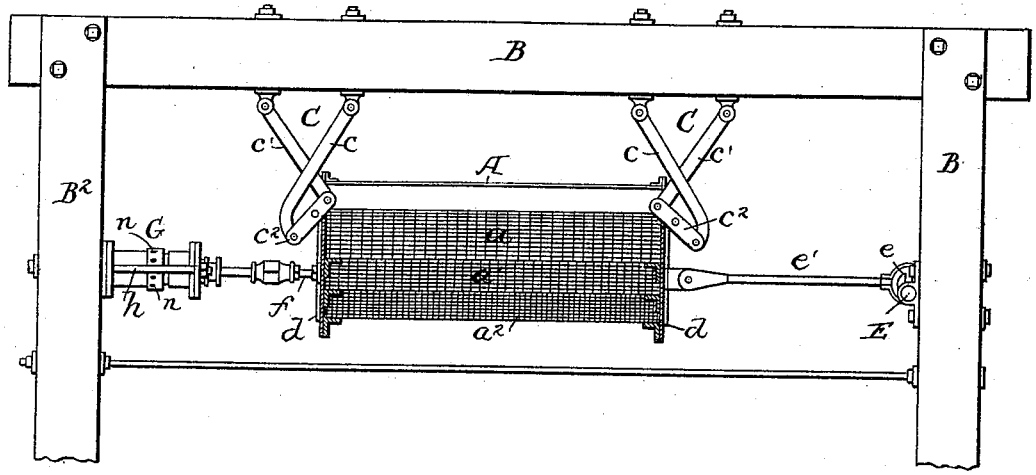
Figure 3:
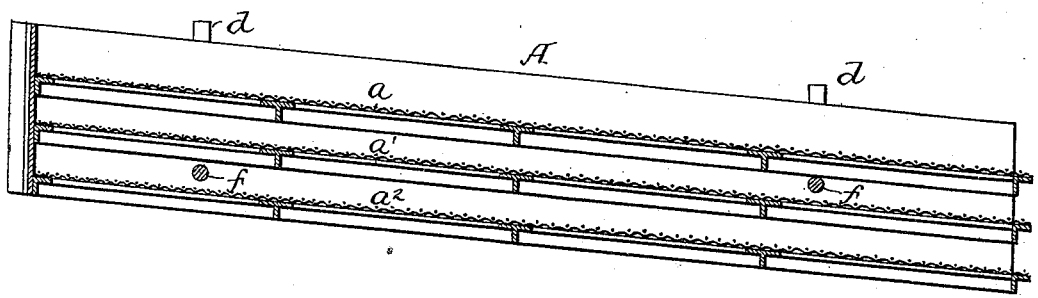
Figure 4:
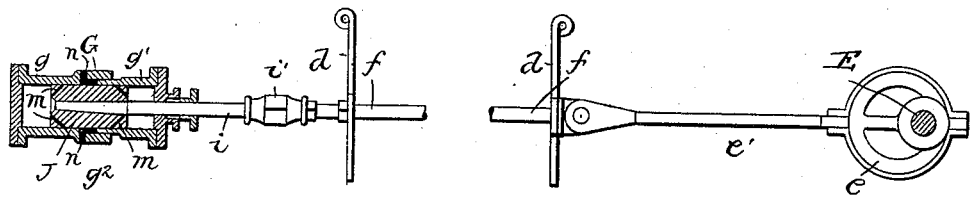

Figure 1 is a perspective view of the entire machine. Fig. 2 is a cross-section illustrating the means for suspending and reciprocating the screen-frame. Fig. 3 is a longitudinal section through the screens. Fig. 4 is a detail of the reciprocating devices, and Figs. 5 and 6 are modified forms of screen-supports.

Within a frame A there is supported a series of screens $a$ $a'$ $a^2$, one above the other, with sufficient space between to allow the material which passes through the upper screen to pass out endwise over the under screens if it is too large to pass through them. The several screens may be composed of any suitable material, such as wire-netting, bars, or perforated plates. They are of different mesh, the openings in the upper screen being larger than those in the next lower screen, each screen being of larger mesh than the one below it. The frame and the screens are inclined longitudinally from the receiving end downward to the delivery end; but they are arranged horizontal laterally. The frame and screens may be made of any suitable material, preferably iron, and in order to give them sufficient strength I have placed angle-iron supports beneath the screens and angle-iron braces upon the screen-frame.

It is desirable that the screen-frame should be so supported that it may move freely, and also that such movement should be in a horizontal direction, so that power will not be consumed in raising the screen at each reciprocation, as is the case when it is supported by simple links or rods. In order to accomplish this object, I support the screen from the beams B by devices C, composed each of a pair of links $c$ $c'$, which are pivotally connected to a link $c^2$ at their lower ends. When the frame is reciprocated laterally, the lower ends of the link $c$ $c'$ fall and rise according as they approach and recede from the vertical, thus causing the ends of the links $c^2$ to fall and rise correspondingly. By arranging the links $c$ $c'$ across each other, as shown in the drawings, when the screen-frame is reciprocated one end of each link $c^2$ will fall as the other end rises, and there will be an intermediate point of the link having a substantially horizontal movement within certain limits. The screen is pivotally connected to the links $c^2$ at these intermediate points by means of straps $d$, which are fastened to the sides of the screen-frame and have eyes at their upper ends for pivotal connection to the links, as shown. It will be evident that instead of suspending the frame from supports above it the supports might be placed beneath and the connecting-links arranged between the bottom of the screen-frame and such supports, as shown in Fig. 5. The arrangement of the links above the screen is considered preferable, however, inasmuch as lighter material may be used for the links when they are subject to tensile strain only.

In Fig. 6 I have illustrated a form of support in which the links are separated and arranged to incline in opposite directions from the vertical, their free ends being connected by links, as in the other cases illustrated. As shown in the drawings, the screen-frame is supported at four points and provided with three screening-surfaces; but it will be understood that it may have additional supports of the same character and a greater or less number of screening-surfaces, according to the requirements of the work to be performed.

To reciprocate the screen I may use any suitable mechanism. As shown, a shaft E, driven by a pulley E', is mounted upon the upright supports B', and from said shaft a lateral oscillating movement is communicated to the screens by means of eccentrics $e$ and pitmen $e'$ or equivalent devices. The pitmen are connected to rods $f$, which pass through from side to side of the frame.

One great objection to the use of shaking-screens is that the vibration of the screen is transmitted to the frame in which the screen is mounted and to the entire building. From this cause the frame-work and often the building is shaken to pieces. Various means have been employed in attempts to prevent the transmission of vibrations from the screen to the building. I have found that this can best be done by means of air-cushions interposed between the screen and the supporting frame-work or some other fixed abutment. This may be accomplished by the use of cylinders and pistons, which may be connected to the screen and the frame-work in various ways. In addition to forming a cushion by the use of air-compressing devices the momentum of the screen is stored up at each end of its reciprocation or oscillation and released on the return movement, thus very much reducing the power necessary to do the work.

As shown in the drawings, cylinders G are attached to the supports $B^2$, with their axes in line with the rods $f$, which pass through the screen-frame. These cylinders are composed of two portions $g\ g'$, one of which has a threaded bell $g^2$ for receiving the threaded inner end of the other, thus enabling me to adjust the length of the cylinder. The cylinder is fastened to the supports $B^2$ by bolts $h$, which pass through lugs $h'$ upon the cylinder-heads. The piston J is preferably made of considerable length in order to prevent the gas or air from passing from one end of the cylinder to the other. The piston-rod $i$ is connected to the rod $f$ by a turn-buckle $i'$, so that the position of the piston in the cylinder may readily be adjusted. By the use of the devices C, which keep the screen-frame in a constant plane, I am enabled to connect the pistons with said frame by a rigid connection, inasmuch as the rods $f$ always remain in line with the axes of the cylinders.

In order to keep the amount of air in each end of the cylinder uniform, I provide one or more openings $n$ in the cylinder about midway between the cylinder-heads, which openings communicate freely with the interior of the cylinder at each extremity of the movement of the piston. When the piston is elongated, as shown in the drawings, I provide passages $m$, adapted to open communication between the perforations $n$ and the interior of the cylinder at each extreme of the piston-stroke. The openings $n$ are preferably made in the bell of the joint between the two halves of the cylinder, and in order that the pressure of air within the cylinder may be regulated rapidly I prefer to provide a number of openings $n$ around the bell and a number of the diagonal passages $m$ around each end of the piston.

In operation the material to be cleaned and separated is dumped upon the higher end of the upper screen, which is subjected to constant lateral reciprocation, and the different sizes of material will gradually travel along their corresponding screens to the lower or delivery end, where they will be received by chutes (not shown in the drawings) and conveyed to separate receptacles. The larger sizes of coal will be detained by the screen $a$, the next smaller size by the screen $a'$, &c. The shaft $e$ may be constantly revolved from any source of power by means of the belt and pulley $E'$. The eccentrics and the link supports C are so proportioned that the screen-frame will travel horizontally within the limits of the movement imparted by the eccentrics, thus combining the advantages of swinging supports with a horizontal movement. As the screens move in either direction the air or gas in the corresponding ends of the cylinders is compressed, thus forming a cushion to aid in stopping and reversing the movement of the screens and also aiding in starting the movement of the screen on its return stroke.

It will be evident that various changes may be made in details of construction without departing from the spirit of my invention.

Therefore, without limiting myself to the precise form and arrangement of parts shown, what I claim is—

1. The combination, with a shaking-screen, of pivoted link supports therefor, each consisting of a pair of links inclined to each other and having a connecting-link, to which the screen is pivotally attached, substantially as described.

2. The combination, with a shaking-screen, of supports therefor, each consisting of crossed links and a connecting-link, the screen being pivotally joined to the connecting-links, substantially as described.

3. The combination, with a shaking-screen, of frame-work B B, crossed links C C', pivotally joined to the frame-work at their upper ends and connected by links $C^2$ at their lower ends, and lugs upon the screen, pivotally joined to the links $C^2$ between the links C C', substantially as described.

4. The combination, with a shaking-screen, of pivoted link supports therefor, each consisting of a pair of links inclined to each other and having a connecting-link to which the screen is pivotally attached, and cushions interposed between said screen and fixed abutments, substantially as described.

5. The combination, with a screen or separator, of pivoted inclined link supports therefor, whereby to maintain it in the same plane throughout the range of its movement, means for reciprocating it, and one or more cylinders and pistons interposed between the screen and a fixed abutment and having their axes in the plane of movement of the screen or separator, substantially as described.

6. The separator consisting of the laterally-movable screen-frame, having two or more longitudinally-inclined screening-surfaces arranged one above the other, the pivoted crossed link supports, means for reciprocating the frame laterally, and one or more cylinders and pistons interposed between said frame and fixed abutments, substantially as described.

7. The combination, with a shaking-screen, of one or more cylinders and pistons, and means for varying the length of each cylinder and adjusting the piston lengthwise thereof, substantially as described.

8. The air-cushion herein described, consisting of a cylinder having ports midway between its ends, in combination with an elongated piston having passages leading from its cylindrical surface at points between the ends to the end surfaces, substantially as described.

In testimony whereof I affix my signature in presence of two witnesses.

JAMES POLLOCK.

Witnesses:
 WM. C. PRICE,
 B. R. JONES.